United States Patent Office 2,824,104
Patented Feb. 18, 1958

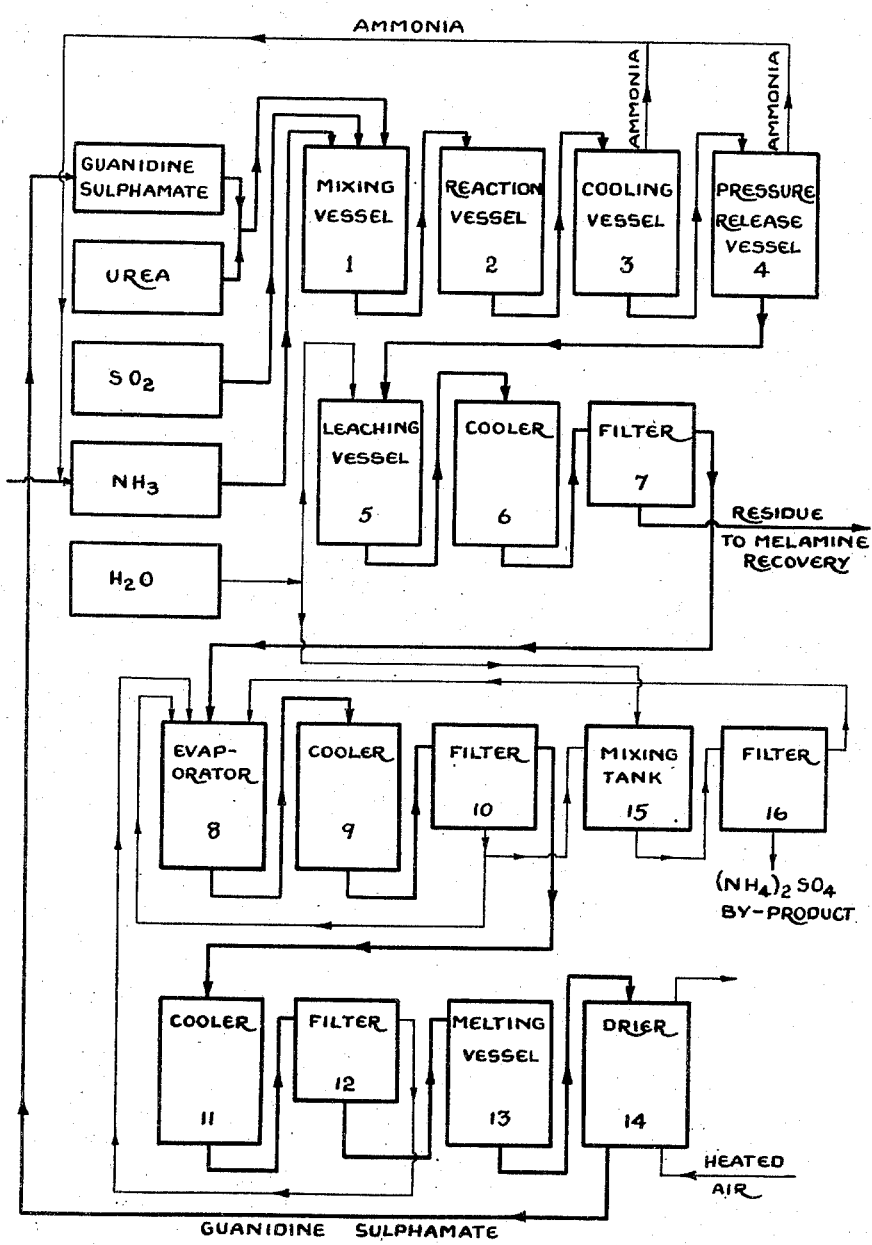

2,824,104

PROCESS FOR THE PRODUCTION OF MELAMINE

Joseph Newton Robinson and Frederick John Leslie Miller, Trail, British Columbia, Basil McDonnell, Rossland, British Columbia, and John Frederick Villiers-Fisher, Trail, British Columbia, Canada, assignors to The Consolidated Mining and Smelting Company of Canada Limited, Montreal, Quebec, Canada, a corporation of Canada Application February 2, 1956, Serial No. 563,132

8 Claims. (Cl. 260—249.7)

This invention relates to the production of melamine by the reaction of ammonia, sulphur dioxide and urea at elevated temperature and under a superatmospheric pressure of ammonia. The invention is particularly directed to a method for the continuous production of melamine from these reactants.

Melamine can be produced by heating a mixture of urea, ammonia and sulphur dioxide in a reaction vessel under a superatmospheric pressure of ammonia. Although a high yield of melamine can be obtained by the reaction of these components under moderately elevated temperature and pressure conditions, melamine and ammonium sulphate are present as solids in the reaction product and it becomes less fluid and more difficult to handle as the yield of melamine increases. At yields above about 35% of the theoretical yield based on the carbon content of the urea, the reaction product is too viscous to be handled in pumps, valves and pipe lines, and continuous operation becomes impractical.

Guanidine sulphamate also is formed by the reaction between urea, sulphur dioxide and ammonia, and will itself react to produce melamine. Guanidine sulphamate has a relatively low melting temperature, about 125° C., and when it is mixed with urea the melting temperature of the mixture is lowered to about 70° C. to 80° C. With guanidine sulphamate added to the other reactants, the necessary fluidity of the reaction product for continuous operation can be maintained with yields of melamine up to about 55% of the theoretical yield based on the carbon content of the urea and guanidine sulphamate added to the reaction vessel.

The guanidine sulphamate in the reaction mixture is molten within the temperature range within which the reaction is conducted and acts as a carrier for the solid material in the reaction product. Guanidine sulphamate reacts to form melamine during the course of the reaction but is itself formed from the initial reactants, urea, sulphur dioxide and ammonia. The net effect, in the preferred method of operating our process, is the conversion to melamine of 100% of the urea added to the reaction vessel, the reaction being conducted in a circulating stream of molten guanidine sulphamate.

If no guanidine sulphamate is added to the reaction mixture initially, the reaction product will solidify in pipe lines, valves and pumps unless the melamine yield is maintained below 35%. Thus, while urea, sulphur dioxide and ammonia can be reacted to produce melamine, we have found that by adding guanidine sulphamate with the other reactants the yield of melamine can be increased above 35% under practical operating conditions and a fluid reaction product is formed which flows freely through the several steps of the process.

A fluid reaction product can be obtained without the addition of guanidine sulphamate by restricting the yield of melamine to less than about 35% of the theoretical yield, but such operation results in the formation of excessive amounts of guanidine sulphamate as a by-product of the reaction and is uneconomic compared with the higher yields obtainable when operating in accordance with the process of the present invention.

The synthesis reaction is exothermic and the heat of reaction will generate autogenously sufficient heat to support the reaction without the addition of extraneous heat, even in the presence of guanidine sulphamate, provided that there are not more than about 2.3 mols guanidine sulphamate per mol urea. If the reaction conditions are controlled to convert all the urea to melamine, the theoretical yield of melamine based on the carbon content of the urea and guanidine sulphamate added to the reaction step must exceed 30% to generate sufficient heat. The process can be operated with lower yields, if desired, by supplying heat to the reaction vessel during the course of the reaction, but it is preferable to operate at higher yield of 30% to 55% of the theoretical yield to take advantage of the heat of reaction and improved economy.

In general, it may be stated that the process operates continuously to produce a fluid reaction mixture without the addition of extraneous heat provided that the amount of guanidine sulphamate recycled to the reaction step is from 45 to 70 mol percent of the total mols of urea and guanidine sulphamate passed to the reaction step and the conditions of reaction are selected to ensure that the amount of melamine formed is substantially equivalent stoichiometrically to the amount of urea added. In other words, the mol ratio of guanidine sulphamate to urea in the initial reaction mixture is preferably within the range of about 0.8 to 1 to about 2.3 to 1 and the reaction conditions are controlled to ensure reaction of all the urea without an appreciable effect on the relative amounts of guanidine sulphamate entering and leaving the reaction step of the process. The mol ratio of guanidine sulphamate to urea entering the reaction zone must not be less than about 0.8 to 1 if continuous operation is to be maintained and preferably would not be more than about 2.3 to 1 to enable the reaction to proceed with reasonably high yields of melamine and without the addition of extraneous heat. In the preferred method of operating the process, the amount of melamine produced in the reaction product is stoichiometrically equivalent to the amount of urea charged to the reaction zone.

The process for the production of melamine according to the present invention is described in detail hereinafter with reference to the attached flow sheet.

1. SYNTHESIS STAGE

The synthesis stage is conducted by reacting urea, sulphur dioxide and ammonia in the presence of guanidine sulphamate in a reaction vessel at elevated temperature and under a superatmospheric pressure of ammonia.

In operation, urea, guanidine sulphamate, sulphur dioxide and ammonia, all preferably in anhydrous condition, are passed continuously from storage to a mixing vessel 1 and then to a reaction vessel 2 such as an autoclave. Two or more reaction vessels in series may be used if desired. The urea and guanidine sulphamate are added to the mixing vessel preferably as a molten mixture and the ammonia and sulphur dioxide are pumped to the vessel, preferably as anhydrous liquids. In passing through the mixing vessel, the reactants are thoroughly mixed and the reaction, particularly between ammonia and sulphur dioxide, is initiated. The initiation of the reaction generates sufficient heat to retain the mixture of urea and guanidine sulphamate in molten condition. If the autogenous heat is not sufficient, heat can be supplied from an extraneous source, such as by heating coils. The mixture is then passed to the reaction vessel where the reaction to form melamine is conducted under controlled conditions to produce the desired yield in the reaction product.

The temperature in the reaction vessel is maintained above about 260° C. and preferably within the range of from about 260° C. to about 360° C. Very satisfactory results are obtained by operating the reaction step of the synthesis stage at a temperature of about 290° C. to about 310° C. Sufficient excess ammonia is added to the reaction vessel to maintain a pressure above about 200 pounds per square inch, preferably at least about 500 pounds per square inch. The sulphur dioxide and urea are added to the mixing vessel, preferably in the mol ratio of about 1½ mols sulphur dioxide per mol urea.

The time of retention of the reaction mixture in the reaction vessel varies inversely with the temperature, that is, as the temperature of the reaction is increased, the time of retention is reduced, and these conditions are regulated to produce the desired yield of melamine in the reaction product. It is necessary, to ensure continuous operation of the reaction step of the synthesis stage, that the reaction product be sufficiently fluid that it flows freely through pipe lines, valves and pumps. The reaction product is in the form of a slurry of solids comprising melamine and ammonium sulphate in molten guanidine sulphamate. A reaction product which contains a yield of melamine greater than about 55% of the theoretical yield based on the carbon of the urea and guanidine sulphamate charged into the reaction vessel cannot be handled conveniently and continuous operation cannot be maintained. It is preferred, therefore, that the yield of melamine in the reaction mixture should not be more than about 55% of the theoretical yield. We have found that the operation of the process is satisfactory when the conditions in the reaction vessel are controlled to produce a reaction product which contains a yield of melamine within the range of from about 30% to 55% of the theoretical yield. The process operates smoothly within this range, the reaction mixture is in fluid condition and flows freely, and as the reaction is exothermic the temperature of the reaction mixture during synthesis can be maintained by the heat of reaction without supplying heat from an extraneous source. As noted previously, it is necessary to operate the process to provide a yield of melamine of at least about 30% to ensure that the reaction will generate sufficient heat to be self sustaining. The following table illustrates the effect of temperature on time of retention.

| Pressure, p. s. i. | Temperature, °C. | Time of Retention, minutes | Percent of Theoretical Yield of Melamine |
|---|---|---|---|
| 500 | 280 | 180 | 30 |
| 500 | 300 | 180 | 45 |
| 500 | 340 | 10 | 30 |
| 500 | 340 | 75 | 60 |

It is preferred to conduct the reaction at a temperature of about 300° C. with a time of retention of about 180 minutes to produce a yield of melamine of about 45% of the theoretical yield. At temperatures above about 310° C. the formation of undesired by-products, including melamine condensation products, becomes excessive, resulting in uneconomic losses and lowered recovery efficiencies.

A series of reactions takes place in the reaction step of the synthesis stage which may be expressed by the following overall equation:

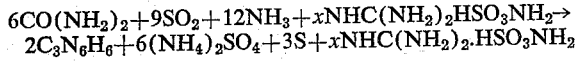

$$6CO(NH_2)_2 + 9SO_2 + 12NH_3 + xNHC(NH_2)_2HSO_3NH_2 \rightarrow 2C_3N_6H_6 + 6(NH_4)_2SO_4 + 3S + xNHC(NH_2)_2 \cdot HSO_3NH_2$$

Reaction product withdrawn from the reaction vessel is passed to a cooling vessel 3 wherein the temperature is reduced to about 120° C. to 200° C. by refluxing ammonia and then to a pressure release vessel 4 wherein the pressure is reduced to atmospheric pressure. Ammonia evolved from the pressure release vessel and from the cooling vessel can be recovered and returned to the process.

2. SEPARATION STAGE

The reaction product of the synthesis stage is in the form of a fluid slurry and contains melamine, guanidine sulphamate, ammonium sulphate, sulphur and small amounts of compounds such as ammeline, ammelide and melamine condensation products. In the preferred method of operating the separation stage of the process, the reaction product is passed as a fluid slurry from the pressure release vessel of the synthesis stage to a leaching vessel 5 wherein it is leached with water, for example, at about 50° C. to 60° C., to dissolve ammonium sulphate and guanidine sulphamate. The resulting mixture is then cooled to within the range of, for example, from about 20° C. to 30° C. by vacuum cooling in cooler 6. The residue from this leaching step contains the melamine and is separated from the solution, for example, by filtration in filter 7. This residue is then treated for the recovery of the melamine.

The filtrate from filter 7, which contains guanidine sulphamate and ammonium sulphate, is fed to a vacuum evaporator 8 wherein the solution is evaporated at a temperature within the range of from about forty to sixty centigrade degrees above the saturation temperature of the solution with respect to guanidine sulphamate. For example, the solution is evaporated at about 80° C. to about 100° C. until ammonium sulphate is precipitated, by crystallization as ammonium sulphate crystals.

Evaporation is continued until the guanidine sulphamate concentration is such that the solution would be saturated at about 40° C. We prefer to evaporate the solution at 80° C. to 100° C., that is, appreciably above the saturation temperature of the solution with respect to guanidine sulphamate, as we have found that larger crystals of ammonium sulphate are formed in this manner than would be formed at lower temperatures. These larger crystals improve the ease of filtration and washing.

From the evaporator 8, the solution and suspended ammonium sulphate crystals pass to a vacuum cooler 9, wherein the temperature is lowered almost to the saturation temperature of the solution with respect to guanidine sulphamate, that is, to about 40° C., to crystallize more ammonium sulphate from the solution. The cooled mixture is then filtered in filter 10 to separate crystallized ammonium sulphate from the solution.

Part of the filter cake from filter 10 is returned to evaporator 8 to assist in ensuring the formation of relatively large crystals of ammonium sulphate. The remainder is mixed with water in mixing tank 15 to form a slurry, filtered in filter 16 and washed to dissolve any guanidine sulphamate retained with the ammonium sulphate and to produce a marketable ammonium sulphate product. The filtrate and washings from this ammonium sulphate purifying step are returned to evaporator 8.

The filtrate from the ammonium sulphate separation step, that is from filter 10, is at a temperature of about 40° C. This filtrate is passed to a vacuum cooler 11 wherein the temperature is lowered to within the range of from about 30° C. to about 20° C. to precipitate guanidine sulphamate from the solution by crystallization.

Precipitated guanidine sulphamate is separated from the solution by filtration in filter 12, washed, dried in dryer 14 and returned to the synthesis stage of the process. In the preferred drying step illustrated in the drawing, the guanidine sulphamate is melted in vessel 13 and passed downwardly at about 125° C. through drying column 14 in countercurrent to an upwardly flowing current of a hot gas such as air.

The filtrate from the guanidine sulphamate separation step is returned to evaporator 8.

*Example*

About 150 pounds of ammonia, 60 pounds of urea, 105 pounds of sulphur dioxide and 185 pounds of guanidine sulphamate mixed with about 20 pounds of ammonium sulphate are passed per minute through mixing vessel 1 to a reaction vessel 2 wherein they are heated to about 300° C. for about 3 hours under a pressure of ammonia of about 500 pounds per square inch. The reaction product, in the form of a fluid slurry, is passed from the reaction vessel to a cooling vessel 3 wherein the temperature is reduced to about 120° C. by refluxing ammonia, and then to a pressure release vessel 4 where the pressure is reduced to atmospheric by release of ammonia. About 110 pounds of ammonia are evolved during the cooling and pressure release steps and returned to the process.

Formation of melamine during the reaction step is about 45% of the theoretical yield based on the carbon of the urea and guanidine sulphamate added to the reaction vessel. The reaction product leaving the pressure release vessel contains about 190 pounds of guanidine sulphamate, 160 pounds of ammonium sulphate, 20 pounds of sulphur, 0.5 pound ammeline and about 42 pounds of melamine.

This reaction product is leached at about 60° C. with about 220 pounds of water in vessel 5. The resulting mixture of solids and solution is cooled to about 20° C. in cooler 6 and filtered in filter 7.

The filter cake, containing elemental sulphur, ammeline and melamine is separately treated for the recovery of melamine. One successful treatment for the recovery of melamine involves leaching the cake with dilute sulphuric acid whereby melamine is converted to melamine sulphate, which is relatively insoluble, and the soluble sulphate and sulphamate compounds are brought into solution. The mixture is then filtered to separate the insoluble material, including sulphur and melamine sulphate, from the solution. The melamine sulphate containing residue can then be treated to produce pure melamine by the carbonate process described in co-pending application Serial No. 563,120 filed concurrently herewith in the name of Harry Edward Jackson.

The filtrate from filter 7 is evaporated at about 90° C. in evaporator 8 to crystallize ammonium sulphate. A mixture of solution and suspended ammonium sulphate crystals is withdrawn from evaporator 8 and passed to vacuum cooler 9 wherein the temperature of the mixture is reduced to about 40° C., which is the saturation temperature of the solution with respect to guanidine sulphamate. Further precipitation of ammonium sulphate occurs and the resulting mixture is filtered by filter 10. A portion of the filter cake is mixed with water in mixing tank 15 to form a slurry and the resulting slurry is passed to filter 16. Filtrate from filter 16 is returned to evaporator 8. The filter cake from filter 16 is washed with a small amount of water which is then passed from filter 16 to filter 10 to wash the cake thereon and thence to evaporator 8. Washed filter cake from filter 16, amounting to about 140 pounds of ammonium sulphate, is dried and stored as a marketable product.

The remaining part of the cake from filter 10 is returned to evaporator 8 to assist in producing large size crystals of ammonium sulphate.

The filtrate from filter 10 is cooled to about 30° C. in vacuum cooler 11 to precipitate guanidine sulphamate by crystallization. Guanidine sulphamate crystals are separated from the solution by filter 12 and the filtrate is cycled to evaporator 8. The filter cake is passed to melting vessel 13.

Crystallized guanidine sulphamate is melted in vessel 13 and is passed to drying column 14 through which it flows downwardly in countercurrent to a flow of hot air. This drying step is carried out at about 125° C. The dried, molten guanidine sulphamate, about 185 pounds, contains about 20 pounds of ammonium sulphate in solution and is returned to the synthesis stage of the process where it is mixed with urea for recycle through the process.

Various modifications may be made in this process. For example, the process can be used to produce guanidine sulphamate and melamine concurrently in which case the process would be controlled to produce a lower yield of melamine and a higher yield of guanidine sulphamate and a portion of the dried guanidine sulphamate would be withdrawn from the process as a desired by-product. The process can also be adapted for the production of guanidine sulphamate as the major product in which case there would be no need to recirculate guanidine sulphamate.

It will be understood, of course, that further modifications can be made in the preferred embodiment of the invention described herein without departing from the scope of the invention as defined by the appended claims.

What we claim as new and desire to protect by Letters Patent of the United States is:

1. In a process for the production of melamine by reacting urea, sulphur dioxide and added ammonia in a reaction zone maintained at a temperature above about 260° C. and under a superatmospheric pressure of ammonia, the improvement which comprises the steps of conducting the reaction in a circulating stream of molten guanidine sulphamate until a reaction product is formed which contains sulphur, ammonium sulphate and at least about 30% of the theoretical yield of melamine, withdrawing reaction product from the reaction zone as a suspension in molten guanidine sulphamate, separately recovering melamine, ammonium sulphate and guanidine sulphamate from the reaction product, and re-cycling at least part of the so-recovered guanidine sulphamate as the circulating stream passing to the reaction zone.

2. A process for the production of melamine according to claim 1 in which the reaction is conducted continuously with the reactants retained in the reaction zone for a period of time sufficient to produce in the reaction product a yield of melamine within the range of from about 30% to about 55% of the theoretical yield based on the carbon content of the urea and guanidine sulphamate charged into the reaction zone.

3. A process for the production of melamine according to claim 1 in which the mol ratio of guanidine sulphamate to urea in the charge to the reaction zone is within the range of from about 0.8:1 to about 2.3:1.

4. A process for the production of melamine according to claim 1 in which the reaction is conducted at a temperature within the range of from about 290° C. to about 310° C. and under a pressure of ammonia of at least about 500 pounds per square inch.

5. In a process for the production of melamine by reacting urea, sulphur dioxide and added ammonia in a reaction zone maintained at a temperature above about 260° C. and under a superatmospheric pressure of ammonia, the improvement which comprises the steps of conducting the reaction in a circulating stream of molten guanidine sulphamate until a reaction product is formed which contains sulphur, ammonium sulphate and at least about 30% of the theoretical yield of melamine, withdrawing reaction product from the reaction zone as a suspension in molten guanidine sulphamate, leaching the reaction product to form an aqueous solution of guanidine sulphamate and ammonium sulphate, separating solid residue from the leach solution and treating the residue for the recovery of melamine, evaporating the guanidine sulphamate containing solution to precipitate ammonium sulphate therefrom, separating precipitated ammonium sulphate from the evaporated solution, cooling the evaporated solution to precipitate guanidine sulphamate therefrom by crystallization, separating crystallized guanidine sulphamate from the cooled solution, returning cooled solution to the evaporating step, driving the guanidine sulphamate and returning at least part of the dried guanidine sulphamate to the reaction zone.

6. A process for the production of melamine according to claim 5 in which the evaporation of guanidine sulphamate solution is conducted at a temperature of 40 to 60 centigrade degrees above the saturation temperature of the solution with respect to guanidine sulphamate, and the evaporated solution is cooled to a temperature slightly above the saturation temperature with respect to guanidine sulphamate before separation of precipitated ammonium sulphate from the solution.

7. A process for the production of melamine according to claim 5 in which guanidine sulphamate separated from the guanidine sulphamate crystallization step is heated to its melting temperature and dried in molten state.

8. A process for the production of melamine according to claim 5 in which part of the precipitated ammonium sulphate separated from the evaporated guanidine sulphamate containing solution is returned to the evaporating step.

References Cited in the file of this patent

UNITED STATES PATENTS 2,575,498     Mackay  ---------------- Nov. 20, 1951

FOREIGN PATENTS 162,088     Australia  -------------- Mar. 21, 1955